United States Patent
Hashimoto

(10) Patent No.: US 10,011,059 B2
(45) Date of Patent: Jul. 3, 2018

(54) INJECTION MOLDING DIE

(71) Applicant: Enplas Corporation, Saitama (JP)

(72) Inventor: Masaomi Hashimoto, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 313 days.

(21) Appl. No.: 15/023,467

(22) PCT Filed: Aug. 18, 2014

(86) PCT No.: PCT/JP2014/071536
§ 371 (c)(1),
(2) Date: Mar. 21, 2016

(87) PCT Pub. No.: WO2015/045671
PCT Pub. Date: Apr. 2, 2015

(65) Prior Publication Data
US 2016/0207232 A1    Jul. 21, 2016

(30) Foreign Application Priority Data
Sep. 24, 2013 (JP) .................................. 2013-196639

(51) Int. Cl.
B29C 45/73 (2006.01)
B29C 45/00 (2006.01)
(Continued)

(52) U.S. Cl.
CPC .......... B29C 45/0025 (2013.01); B22C 9/065 (2013.01); B22D 17/2218 (2013.01);
(Continued)

(58) Field of Classification Search
CPC .......................... B29C 45/73; B29C 45/7312
See application file for complete search history.

(56) References Cited

U.S. PATENT DOCUMENTS

2006/0249862 A1* 11/2006 Ciccone ................ B29C 33/046
264/1.1
2013/0009345 A1   1/2013 Iijima et al.

FOREIGN PATENT DOCUMENTS

DE         10022289    * 11/2001
JP         7-195443      8/1995
(Continued)

OTHER PUBLICATIONS

International Search Report dated Nov. 4, 2014 in corresponding International Application No. PCT/JP/2014/071536 (with English translation).

Primary Examiner — Jill L Heitbrink
(74) Attorney, Agent, or Firm — Wenderoth, Lind & Ponack L.L.P.

(57) ABSTRACT

A movable mold includes a movable mold main body and a gear piece attached to the movable mold main body so as to relatively movable, and having a cavity formation space for forming a cavity. In the gear piece, a piece-side coolant flow path includes an annular flow path surrounding the cavity formation space, a piece-side supply flow path introducing coolant into the annular flow path, and a piece-side discharge flow path introducing the coolant from the annular flow path. The piece-side coolant flow path is connected to a movable mold main body-side supply flow path of the movable mold main body and a movable mold main body-side discharge flow path of the movable mold main body and the coolant flows therein under negative pressure generated by a coolant circulation device, so the inside of the cavity can be cooled effectively.

8 Claims, 18 Drawing Sheets

(51) Int. Cl.
    *B22C 9/06*     (2006.01)
    *B22D 17/22*     (2006.01)
    *B29C 45/04*     (2006.01)
    *B29C 45/26*     (2006.01)
    *B29C 45/40*     (2006.01)
    *B29C 45/64*     (2006.01)
    *B29C 45/72*     (2006.01)
    *B29L 15/00*     (2006.01)

(52) U.S. Cl.
    CPC ...... *B29C 45/0441* (2013.01); *B29C 45/2681* (2013.01); *B29C 45/40* (2013.01); *B29C 45/64* (2013.01); *B29C 45/7207* (2013.01); *B29C 45/73* (2013.01); *B29C 45/7312* (2013.01); *B29L 2015/003* (2013.01)

(56) References Cited

FOREIGN PATENT DOCUMENTS

| | | |
|---|---|---|
| JP | 8-216161 | 8/1996 |
| JP | 11-58465 | 3/1999 |
| JP | 2003-39437 | 2/2003 |
| JP | 2007-130902 | 5/2007 |
| JP | 2013-14075 | 1/2013 |

\* cited by examiner

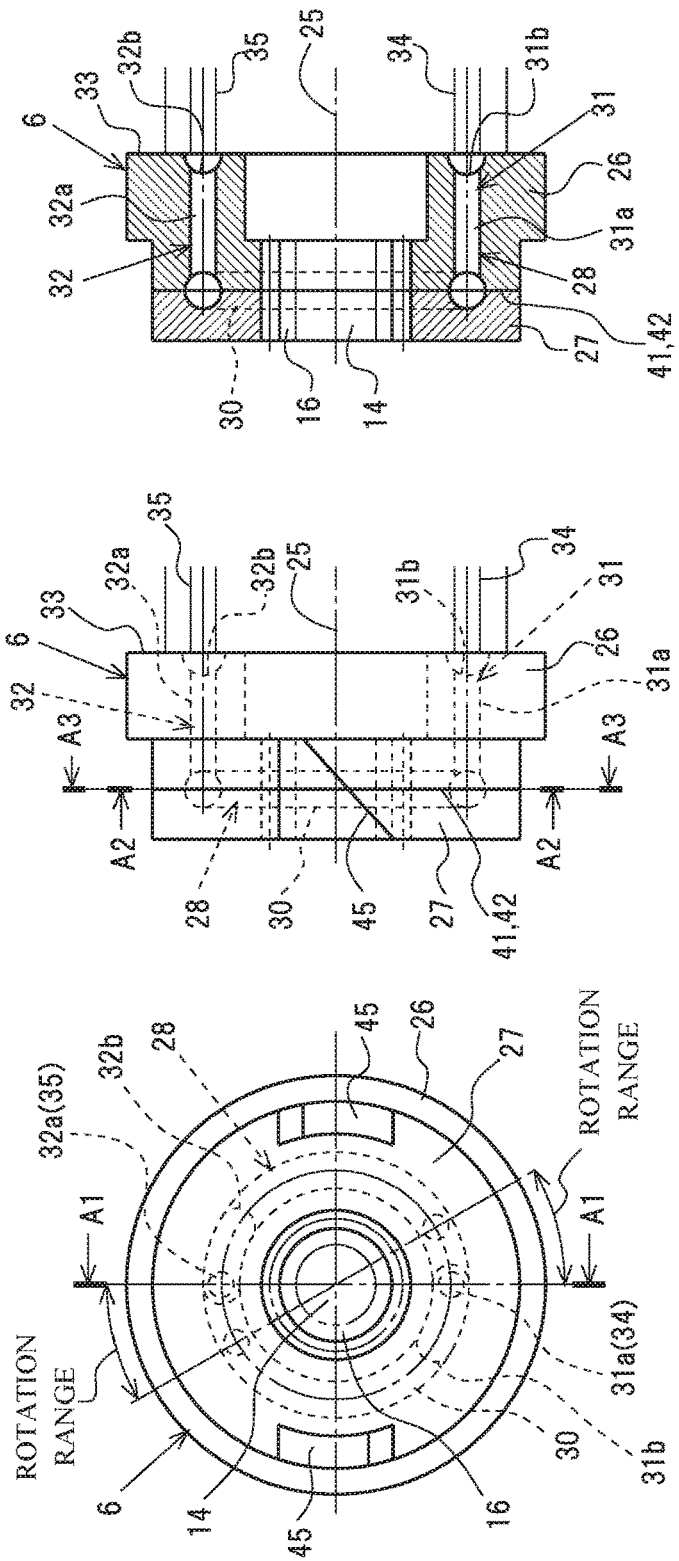

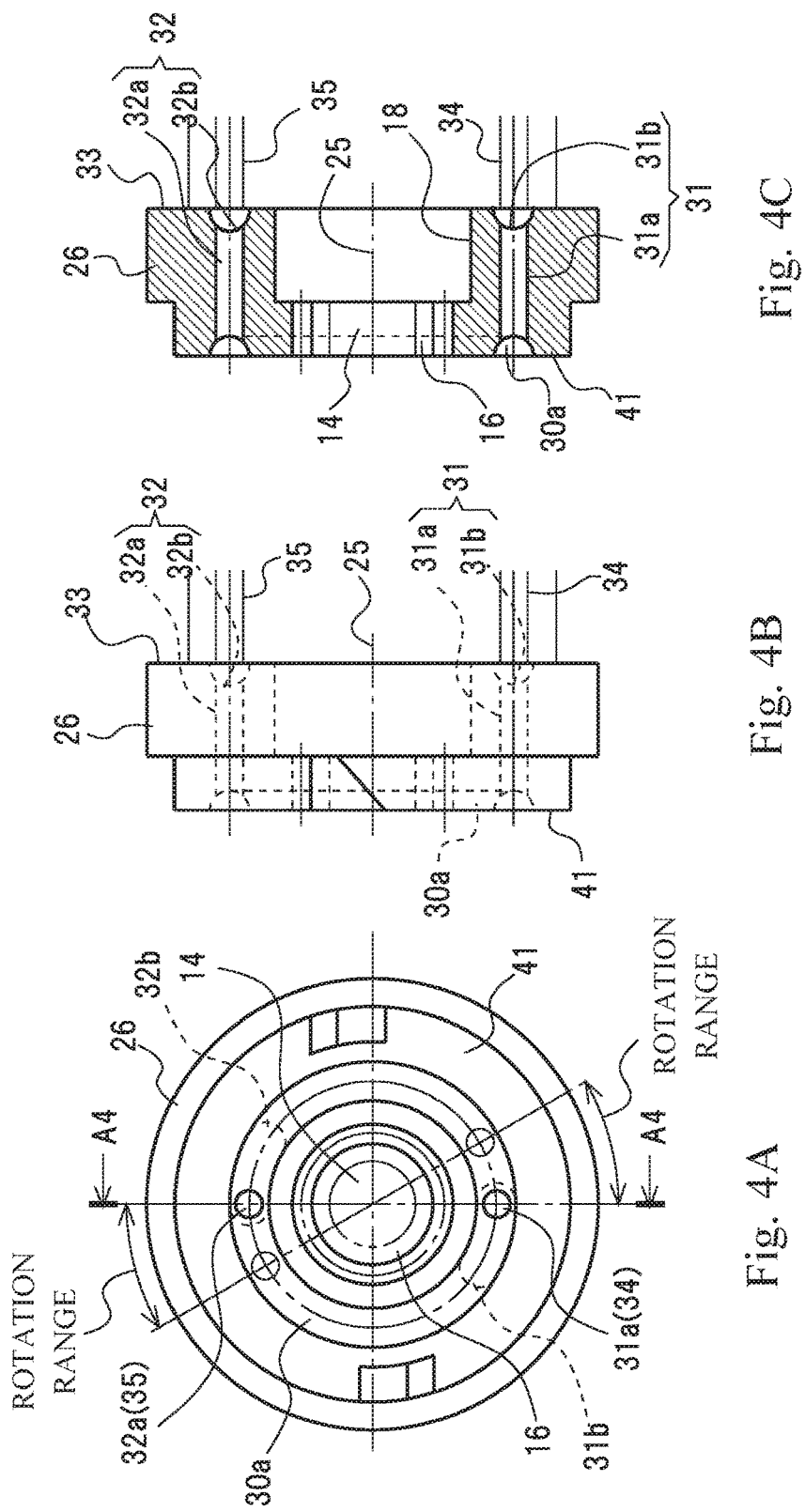

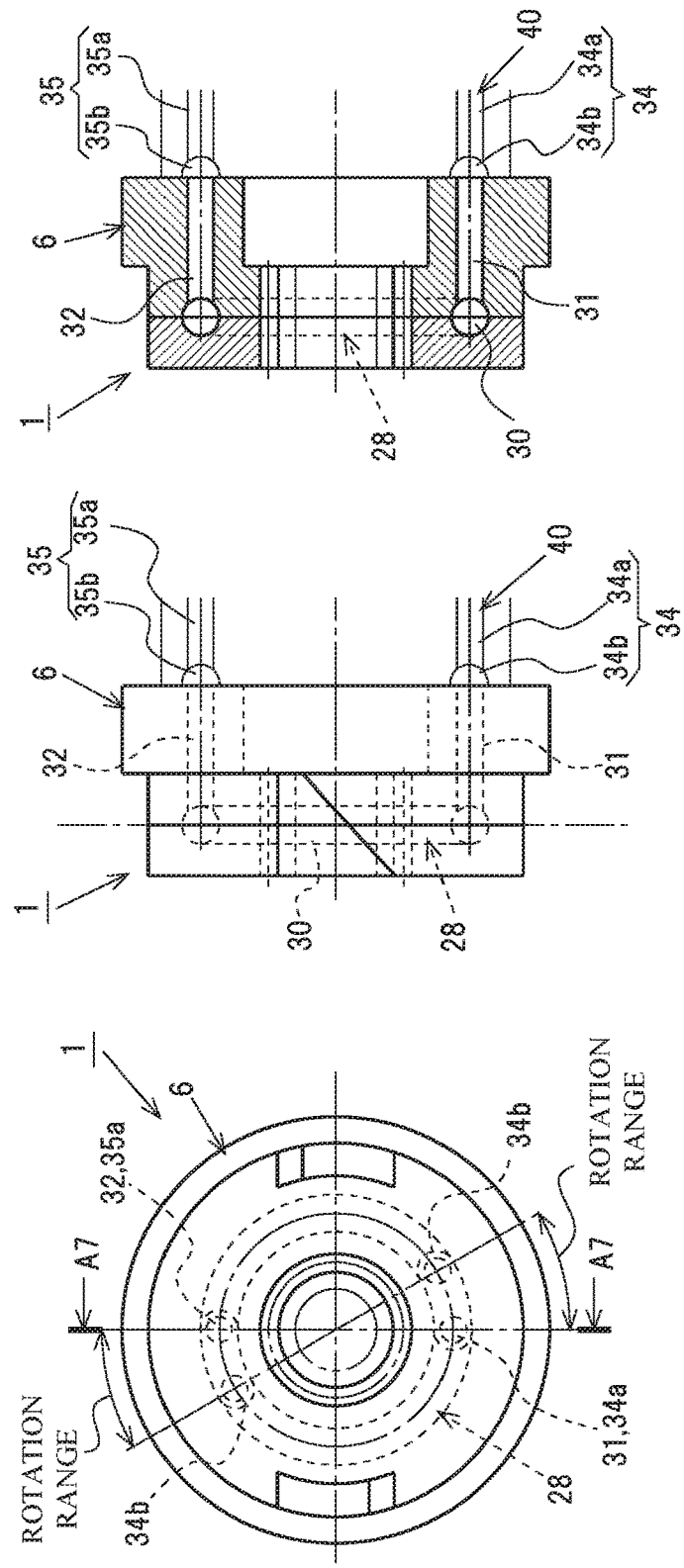

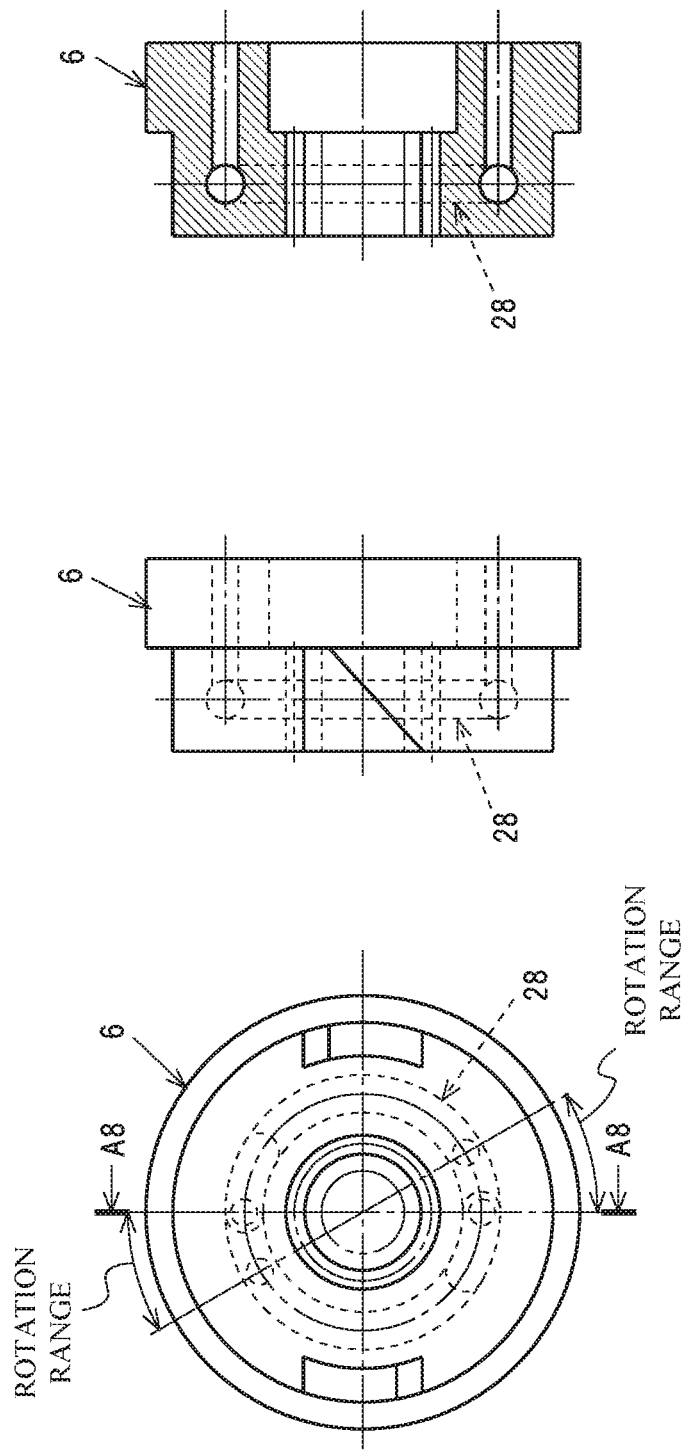

INJECTION MOLDING DIE

TECHNICAL FIELD

The present invention relates to an injection molding die, more specifically to an injection molding die featuring the cooling structure of a cavity.

BACKGROUND ART

FIG. 18 illustrates an injection molding die 102 having a mechanism for rotating a gear piece (molded article piece) 100 during molding of a helical gear or the like and a cooling mechanism 101 for cooling the gear piece 100. The conventional injection molding die 102 illustrated in FIG. 18 has the gear piece 100 in which a cavity 103 for shaping a molded article such as a helical gear is formed and a fixed piece 105 fitted into a fixed piece housing groove 104 (so as to relatively rotatable) formed in the part of the gear piece 100 surrounding the cavity 103. In the conventional injection molding die 102, a cooling water path 106 is formed in the fixed piece 105 and water flowing through the cooling water path 106 of the fixed piece 105 cools the gear piece 100.

In the conventional injection molding die 102 having such a structure, since the gear piece 100 can rotate about the fixed piece 105 and the gear piece 100 is cooled (indirectly cooled via the fixed piece 105) by water flowing through the cooling water path 106 in the fixed piece 105, defective molding caused by the difference in local shrinkage of the helical gear (molded article) is reduced and the cycle time required for injection molding of the helical gear is reduced (see PTL 1).

CITATION LIST

Patent Literature

PTL 1: JP-A-2007-130902

SUMMARY OF INVENTION

Technical Problem

However, in the conventional injection molding die 102 illustrated in FIG. 18, since the fixed piece 105 is fitted into the fixed piece housing groove 104 of the gear piece 100 and an air layer is formed between the outer surface of the fixed piece 105 and the inner surface of the fixed piece housing groove 104, thermal conduction between the gear piece 100 and the fixed piece 105 is prevented by the air layer, thereby making the cooling of the gear piece (molded article in the cavity) 100 insufficient.

In addition, in the conventional injection molding die 102 illustrated in FIG. 18, O-rings 108A and 108B for sealing are disposed between the fixed piece 105 and a backup plate 107 to which the fixed piece 105 is attached to prevent water from leaking from the cooling water path 106 formed in the fixed piece 105. Accordingly, the structure of the die becomes complicated since the hermetic structure (including the O-rings 108A and 108B and O-ring housing grooves 110A and 110B) for water is provided.

An object of the invention is to provide an injection molding die having a simple structure and capable of effectively cooling the molded article in the cavity.

Solution to Problem

As illustrated in FIGS. 1 to 17, the invention relates to injection molding dies 1 and 51 including fixed molds 3 and 52 and movable molds 4 and 53 performing mold clamping and mold opening with respect to the fixed molds 3 and 52. In the invention, the movable molds 4 and 53 include movable mold main bodies 5 and 54 and molded article pieces 6 and 55 (55A and 55B) having cavity formation spaces 14 and 64 for forming cavities 16 and 58, the molded article pieces 6 and 55 being attached to the movable mold main bodies 5 and 54 so as to be relatively movable. The molded article pieces 6 and 55 (55A and 55B) include cavity cooling flow paths 30, 65, and 65 formed along the cavity formation spaces 14 and 64, piece-side supply flow paths 31 and 66 introducing coolant into the cavity cooling flow paths 30, 65, and 65, and piece-side discharge flow paths 32 and 67 introducing the coolant from the cavity cooling flow paths 30, 65, and 65. In addition, the movable mold main bodies 5 and 54 includes movable mold main body-side supply flow paths 34 and 68 connected to the piece-side supply flow paths 31 and 66 and movable mold main body-side discharge flow paths 35 and 70 connected to the piece-side discharge flow paths 32 and 67 during mold clamping and until movement of the molded article pieces 6 and 55 during removal of molded articles 2 and 62 from the cavities 16 and 58 after mold opening. In addition, the movable mold main body-side supply flow paths 34 and 68, the piece-side supply flow paths 31 and 66, the cavity cooling flow paths 30, 65, and 65, the piece-side discharge flow paths 32 and 67, and the movable mold main body-side discharge flow paths 35 and 70 are connected to a coolant circulation device 36 causing the coolant to flow under negative pressure. The cavities 16 and 58 of the molded article pieces 6 and 55 (55A and 55B) are cooled by the coolant in the piece-side supply flow paths 31 and 66, the cavity cooling flow paths 30, 65, and 65, and the piece-side discharge flow paths 32 and 67 by bypassing an air layer.

Advantageous Effects of Invention

According to the invention, the heat of the molded article in the cavity is conducted to the molded article piece and the heat of the molded article piece is directly conducted to the coolant flowing through the cavity cooling flow paths, the piece-side supply flow paths, and the piece-side discharge flow paths of molded article piece bypassing the air layer, so the molded article in the cavity is effectively cooled. According to the invention, defective molding caused by the difference in local shrinkage of the molded article can be reduced and the cycle time of injection molding can be reduced.

In the invention, since the coolant circulation device circulates the coolant through the movable mold main body-side supply flow paths, the piece-side supply flow paths, the cavity cooling flow paths, the piece-side discharge flow paths, and the movable mold main body-side discharge flow paths under negative pressure, it is not necessary to provide a hermetic structure for preventing leakage of the coolant in the part in which the molded article piece moves relatively to the movable mold main body, thereby enabling reduction in the number of components in the injection molding die and simplification of the mold structure of the injection molding die.

BRIEF DESCRIPTION OF DRAWINGS

FIG. 3 illustrates a gear piece (molded article piece). FIG. 3A is a plan view of the gear piece, FIG. 3B is a side view of the gear piece, and FIG. 3C a cross sectional view of a cross section A1-A1 in FIG. 3A of the gear piece.

FIG. 4 illustrates a first gear piece portion. FIG. 4A is a plan view (a cross section A2-A2 in FIG. 3B) of the first gear piece portion, FIG. 4B a side view of the first gear piece portion, and FIG. 4C a cross sectional view of a cross section A4-A4 in FIG. 4A.

FIG. 5 illustrates a second gear piece portion.

FIG. 6 illustrates a coolant flow path.

FIG. 7 illustrates original position restoring means provided in the injection molding die.

FIG. 10 illustrates modification 1 of the injection molding die according to the embodiment of the invention, more specifically a modification of the coolant flow path.

FIG. 11 illustrates modification 1 of the injection molding die according to the embodiment of the invention, more specifically modifications of a piece-side coolant flow path, a movable mold-side supply flow path, and a movable mold-side discharge flow path of the gear piece. FIG. 11A is a plan view of the gear piece, FIG. 11B is a side view of the gear piece, and FIG. 11C is a cross sectional view of a cross section A7-A7 of the gear piece in FIG. 11A.

FIG. 13 illustrates modification 3 of the injection molding die according to the embodiment of the invention, more specifically a part (the relational drawing of the gear piece and the shaft mold) of the injection molding die. FIG. 13A is a plan view of the gear piece, FIG. 13B is a side view of the gear piece, and FIG. 13C is a cross sectional view of a cross section A8-A8 of the gear piece in FIG. 13A.

FIG. 14 illustrates modification 4 of the injection molding die according to the embodiment of the invention and corresponds to FIG. 6.

FIG. 16 illustrates modification 7 of the injection molding die according to the embodiment of the invention, more specifically the injection molding die during mold clamping.

FIG. 17 illustrates modification 7 of the injection molding die according to the embodiment of the invention, more specifically the injection molding die during mold opening.

DESCRIPTION OF EMBODIMENTS

An embodiment of the invention will be described in detail below with reference to the drawings.

Figure 1:
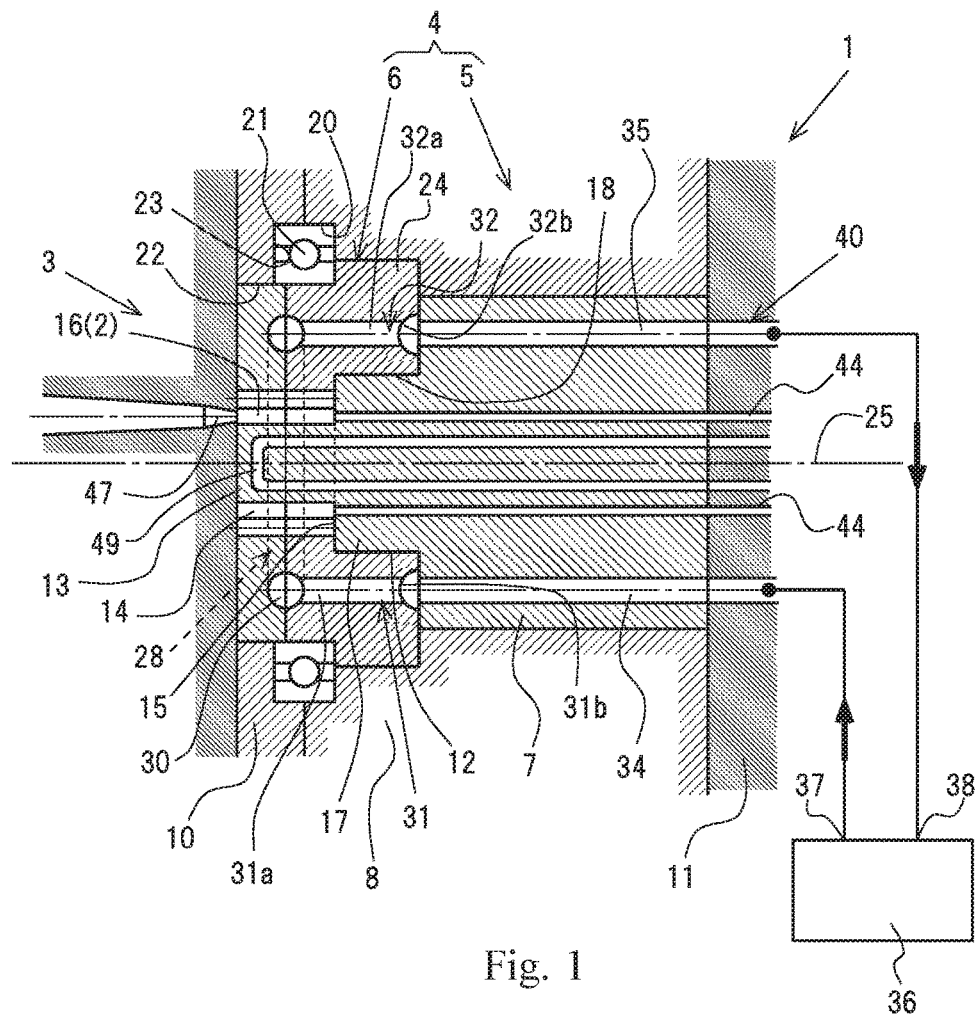
FIG. 1 is a vertical cross sectional view illustrating an injection molding die according to an embodiment of the invention during mold clamping.
Figure 2:
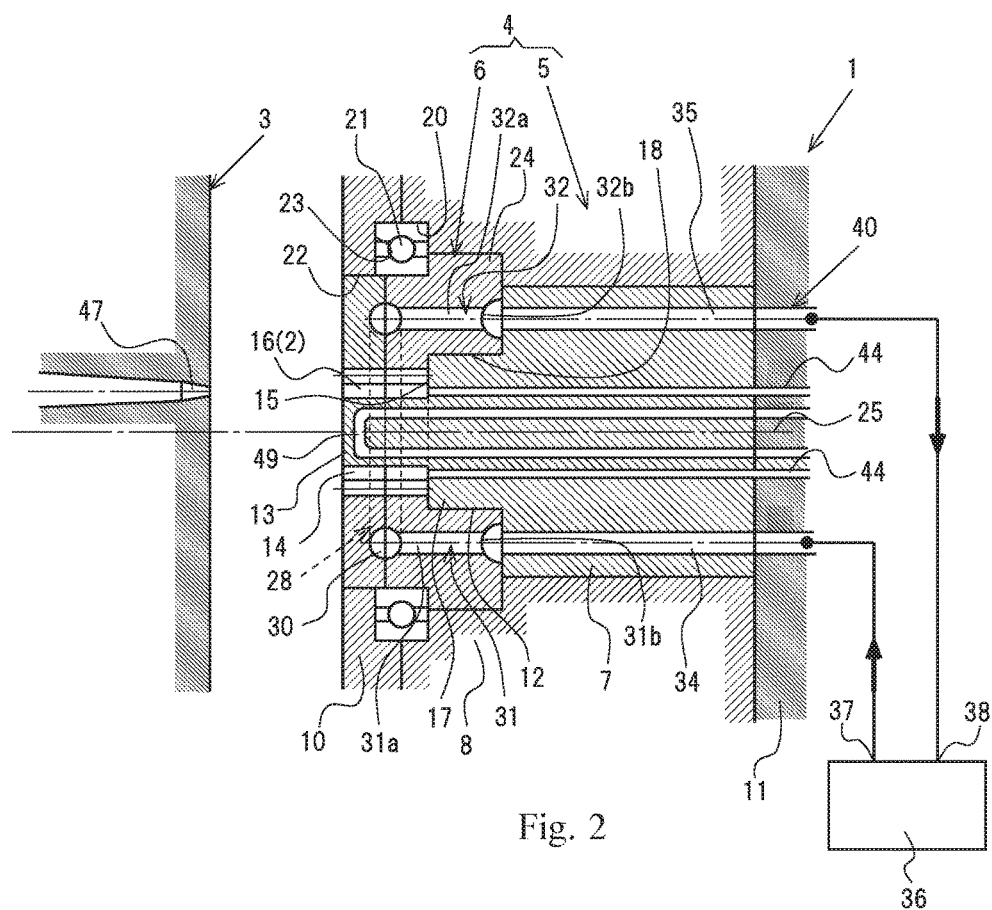
FIG. 2 is a vertical cross sectional view illustrating the injection molding die according to the embodiment of the invention during mold opening.
Figure 9A:
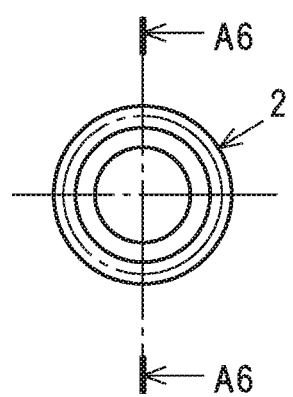
FIG. 9A is a front view of a helical gear.
Figure 9B:
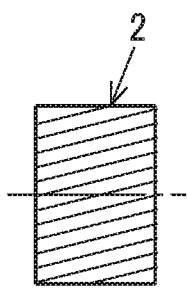
FIG. 9B illustrates a side view of the helical gear.
Figure 9C:
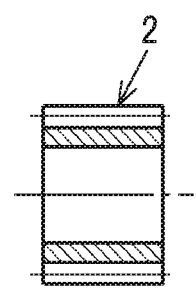
FIG. 9C is a cross sectional view of a cross section A6-A6 in FIG. 9A.

FIGS. 1 and 2 are vertical cross sectional views illustrating an injection molding die 1 according to the embodiment and the injection molding die 1 is used for injection molding of a helical gear 2 (see FIG. 9). FIG. 1 is a vertical cross sectional view illustrating the injection molding die 1 during mold clamping. FIG. 2 is a vertical cross sectional view illustrating the injection molding die 1 during mold opening.

As illustrated in FIG. 1, the injection molding die 1 includes a fixed mold 3 fixed to the main body of the injection molding machine (not illustrated) and a movable mold 4 disposed movably with respect to the fixed mold 3 to enable mold clamping and mold opening.

The movable mold 4 includes a movable mold main body 5 and a gear piece (molded article piece) 6 housed in the movable mold main body 5 so as to be relatively movable. The movable mold main body 5 includes a shaft mold 7, a first block 8 housing the shaft mold 7, the second block 10 fixed to the surface (surface facing the fixed mold 3) of the first block 8, and a backup block 11 fixed to the back surface of the first block 8. In a gear piece housing recessed portion 12 formed on the outer periphery side of the shaft mold 7 of the movable mold main body 5, a gear piece 6 is housed so as to be relatively movable. A shaft hole formation portion 13 at an end of the shaft mold 7 is fitted into a center hole 14 (cavity formation space for forming the cavity 16) of the gear piece 6, so that the cavity 16 is formed by the outer periphery surface of the shaft hole formation portion 13, the inner surface of the center hole 14 of the gear piece 6, and a gear piece abutting surface 15 positioned adjacently to the shaft hole formation portion 13. In addition, the shaft mold 7 is fitted so that a piece support portion 17 formed adjacently to the shaft hole formation portion 13 is relatively rotatable with respect to a shaft hole 18 of the gear piece 6.

In addition, the movable mold 4 fits a bearing 21 into an annular bearing reception recessed portion 20 formed in the first block 8 housing the shaft mold 7 and rotatably supports the outer peripheral surface of the gear piece 6 using the bearing 21. In addition, in the movable mold 4, the second block 10 is fixed to the surface of the first block 8 close to the fixed mold 3. In the second block 10, a gear piece fitting hole 22 is formed so as to be fitted onto the outer peripheral surface of the gear piece 6 with clearance left and an annular bearing reception recessed portion 23 is formed.

The bearing 21 attached to the movable mold 4 rotatably supports the gear piece 6. In addition, the bearing 21 has a side in contact with a side of a flange section 24 of the gear piece 6 and positions the gear piece 6 in the direction along a center axis 25 to prevent the gear piece 6 from being removed from the gear piece housing recessed portion 12 of the movable mold 4.

As illustrated in FIGS. 3 to 6, the gear piece 6 is created by integrating the blank of a first gear piece portion 26 with the blank of a second gear piece portion 27 using a metal joint technique (electric pressurizing joint or electric diffusion joint) and then applying various types of removal machining (such as cutting and electric discharging) as appropriate and the gear piece 6 includes a piece-side coolant flow path 28 through which coolant (such as water, ethylene glycol, or oil) flows.

The piece-side coolant flow path 28 includes an annular flow path (cavity cooling flow path) 30 formed along the cavity 16 so as to surround the cavity 16, a piece-side supply flow path 31 introducing coolant into the annular flow path 30, and a piece-side discharge flow path 32 introducing the coolant from the annular flow path 30 (see FIG. 6). The piece-side supply flow path 31 includes the first piece-side supply flow path portion 31a extending a direction along the center axis 25 of the gear piece 6, and the second piece-side supply flow path portion 31b formed on a back surface 33 (surface opposite to the surface facing the fixed mold) of the gear piece 6. In addition, the piece-side discharge flow path 32 includes the first piece-side discharge flow path portion 32a extending in a direction along the center axis 25 of the gear piece 6 and the second piece-side discharge flow path portion 32b formed on the back surface 33 of the gear piece 6. Even when the gear piece 6 rotates by a predetermined angle with respect to the movable mold main body 5, the second piece-side supply flow path portion 31b reliably makes connection between the first piece-side supply flow path portion 31a and a movable mold main body-side supply flow path 34 to enable the coolant to be introduced into the first piece-side supply flow path portion 31a from the movable mold main body-side supply flow path 34. Even when the gear piece 6 rotates by a predetermined angle with respect to the movable mold main body 5, the second piece-side discharge flow path portion 32b reliably makes connection between the first piece-side discharge flow path portion 32a and a movable mold main body-side discharge flow path 35 to enable the coolant to be introduced into the movable mold main body-side discharge flow path 35 from the first piece-side discharge flow path portion 32a. As described above, the piece-side supply flow path 31 is connected to the movable mold main body-side supply flow path 34 not only before the gear piece 6 rotates with respect to the movable mold main body 5, but also after the gear piece 6 rotates by a predetermined angle with respect to the movable mold main body 5. In addition, the piece-side discharge flow path 32 is connected to the movable mold main body-side discharge flow path 35 not only before the gear piece 6 rotates with respect to the movable mold main body 5, but also after the gear piece 6 rotates by a predetermined angle with respect to the movable mold main body 5.

Both the second piece-side supply flow path portion 31b and the second piece-side discharge flow path portion 32b are circumferential grooves formed across a predetermined angle about the center axis 25 of the gear piece 6 and have semicircular cross sections. That is, the piece-side supply flow path 31 of the gear piece 6 is constantly connected to the movable mold main body-side supply flow path 34. In addition, the piece-side discharge flow path 32 is constantly connected to the movable mold main body-side discharge flow path 35. In addition, the movable mold main body-side supply flow path 34 is connected to a coolant supply port 37 of a coolant circulation device 36 and the movable mold main body-side discharge flow path 35 is connected to a coolant discharge port 38 of the coolant circulation device 36. As described above, the piece-side coolant flow path 28, the movable mold main body-side supply flow path 34, and the movable mold main body-side discharge flow path 35 constitute a coolant flow path 40 of the injection molding die 1.

The coolant circulation device 36 includes negative pressure generating means (not illustrated), a coolant tank (not illustrated), a heat exchanger (not illustrated), and the like. The coolant circulation device 36 circulates the coolant through the coolant flow path 40 of the injection molding die 1 under negative pressure generated by the negative pressure generating means and cools the cooling water heated by the injection molding die 1 so as to repeatedly use the cooling water for cooling the injection molding die 1.

As illustrated in FIGS. 3 and 4, the first gear piece portion 26 has a first divided annular flow path 30a obtained by halving the annular flow path 30 on a joint surface 41 (to which the second gear piece portion 27 jointed). The first divided annular flow path 30a is formed like a ring in the joint surface 41 so as to surround the center hole 14 and has a semicircular cross section. In addition, the first gear piece portion 26 has the first piece-side supply flow path portion 31a opened toward the first divided annular flow path 30a along the center axis 25 and has the first piece-side discharge flow path portion 32a opened toward the first divided annular flow path 30a along the center axis 25 in a position deviated from the first piece-side supply flow path portion 31a by 180 degrees. The first piece-side supply flow path portion 31a and the first piece-side discharge flow path portion 32a each have one end opened toward the first divided annular flow path 30a and the other end opened toward the second piece-side supply flow path portion 31b or the second piece-side discharge flow path portion 32b formed in the back surface 33 (surface opposite to the joint surface 41) of the first gear piece portion 26. The center hole 14 of the first gear piece portion 26 has the length obtained by halving the length in the axial direction of the center hole 14 of the gear piece portion 6.

Figure 5A:
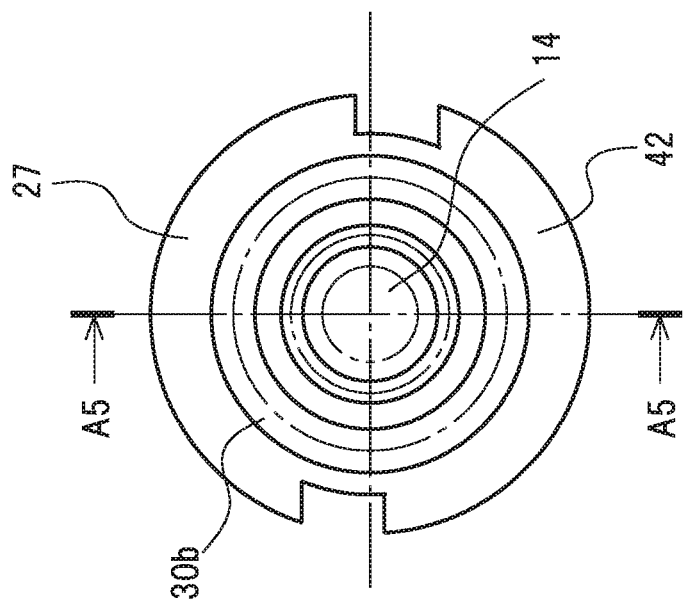
FIG. 5A is a plan view illustrating the second gear piece portion (a cross section A3-A3 in FIG. 3B)
Figure 5B:
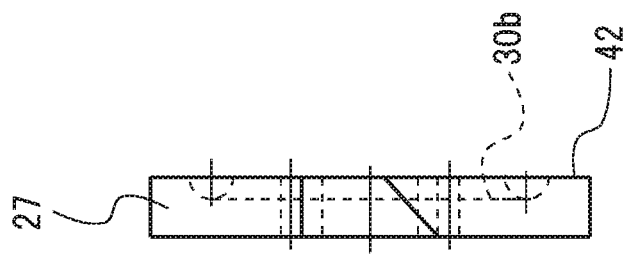
FIG. 5B is a side view of the second gear piece portion.
Figure 5C:
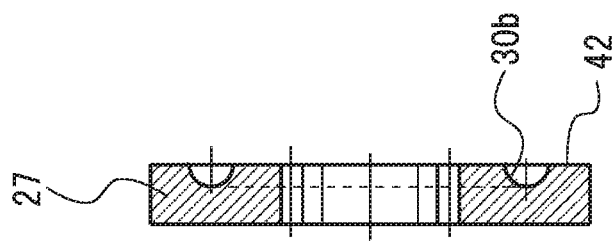
FIG. 5C is a cross sectional view of a cross section A5-A5 in FIG. 5A.
Figure 6A:
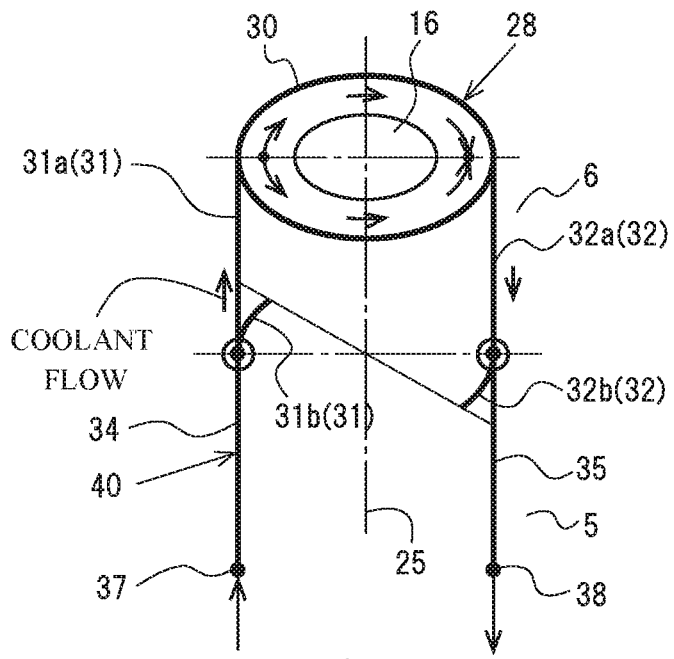
FIG. 6A illustrates the relationship between the gear piece and a movable mold during mold clamping and FIG. 6B illustrates the relationship between the gear piece and the movable mold during removal of the molded article after mold opening.
Figure 6B:
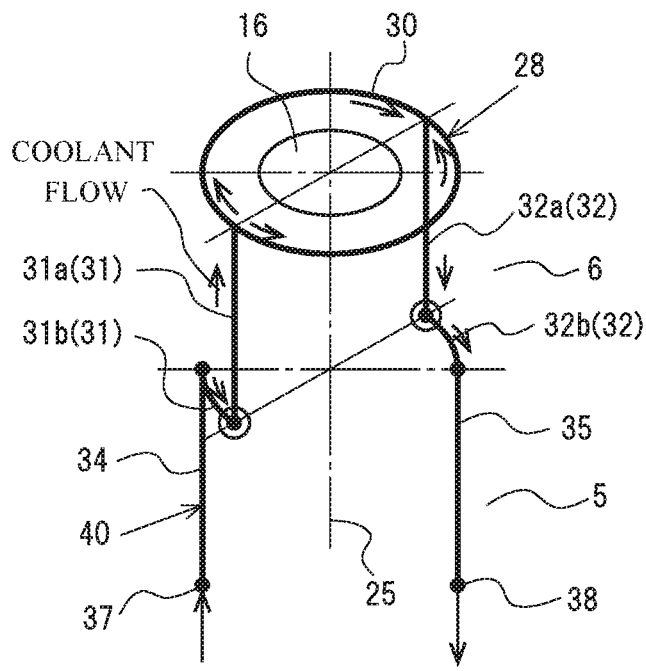

As illustrated in FIGS. 3 and 5, the second gear piece portion 27 has a second divided annular flow path 30b in a joint surface 42 (surface to which the first gear piece portion 26 is jointed) obtained by halving the annular flow path 30. The second divided annular flow path 30b is formed like a ring in the joint surface 42 so as to surround the center hole 14 and has a semicircular cross section.

When, as illustrated in FIG. 3, the joint surface 42 of the second gear piece portion 28 illustrated in FIG. 5 is superimposed on the joint surface 41 of the first gear piece portion 26 illustrated in FIG. 4 and the first gear piece portion 26 is integrated with the second gear piece portion 27 through electric pressurizing joint or electric diffusion joint, the gear piece 6 including the piece-side supply flow path 31, the annular flow path 30, and the piece-side discharge flow path 32 is formed.

Figure 7B:
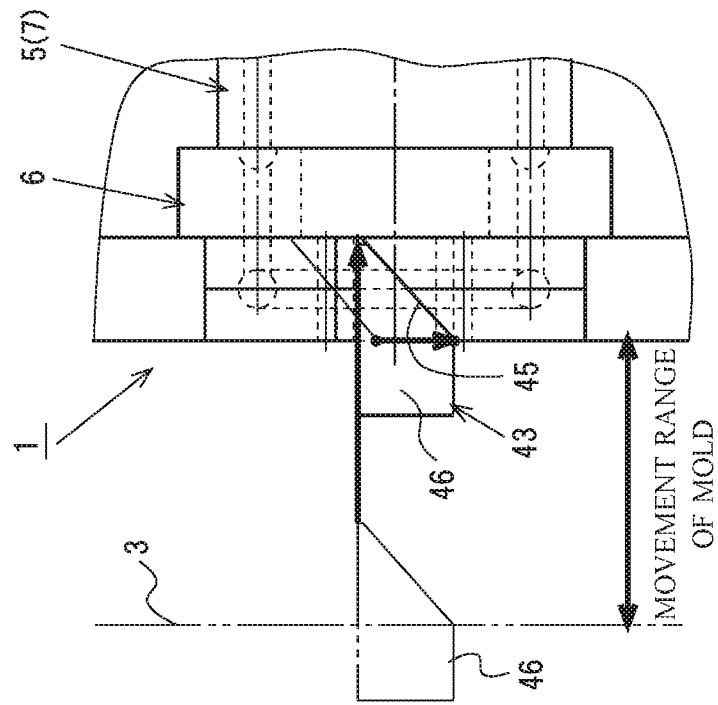
FIG. 7A is a partial plan view of the injection molding die and illustrates the original position restoring means and FIG. 7B is a partial side view of the injection molding die and illustrates the original position restoring means.
Figure 7A:
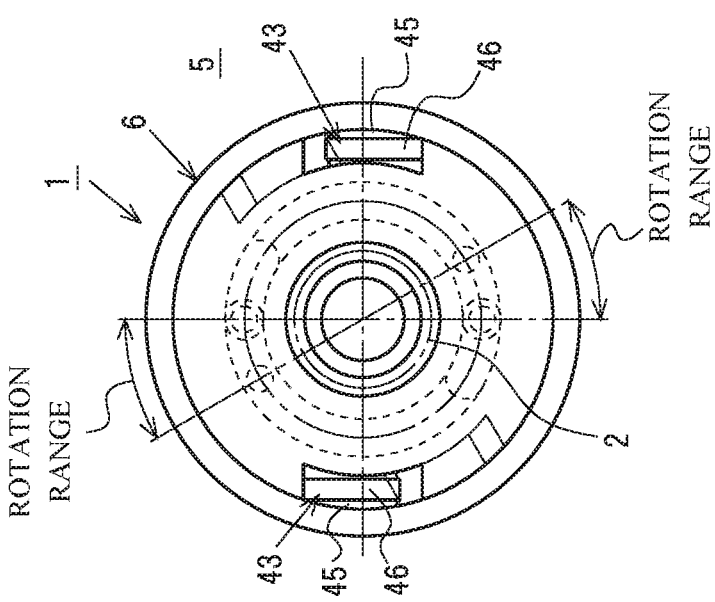

FIG. 7 illustrates the structure of original position restoring means 43 returning, to the original position before rotating, the gear piece 6 rotated by a predetermined angle with respect to the movable mold main body 5. When pushing the helical gear (molded article) 2 from the inside of the cavity 16 using an ejector sleeve 44 after mold opening (after the movable mold 4 is separated from the fixed mold 3) upon completion of injection molding, the gear piece 6 rotates by a predetermined angle (angle corresponding to the torsion angle of a tooth of the helical gear 2) with respect to the movable mold main body 5 (see FIGS. 1, 2, and 6B). After the helical gear (molded article) 2 is removed from the cavity 16, the original position restoring means 43 returns the gear piece 6 to the original position before rotating during mold clamping (see FIGS. 1, 2, and 6A).

Figure 8A:
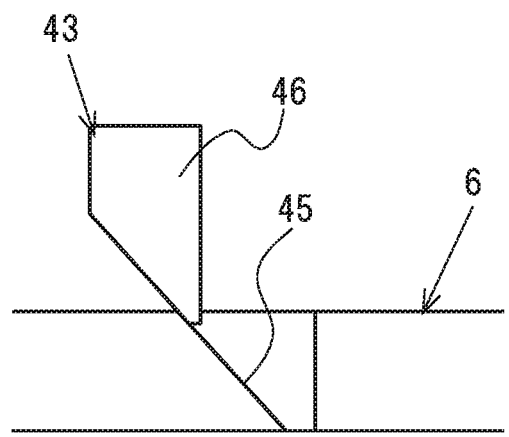
FIG. 8A illustrates a first operation state of the original position restoring means.
Figure 8B:
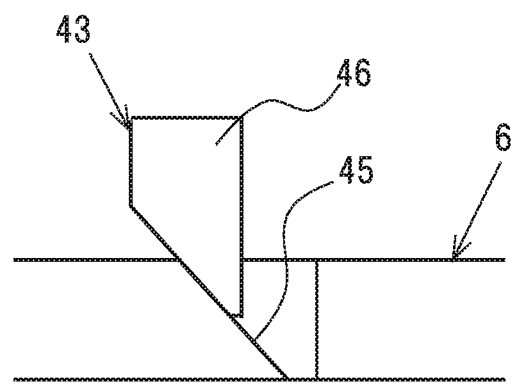
FIG. 8B illustrates a second operation state of the original position restoring means.
Figure 8C:
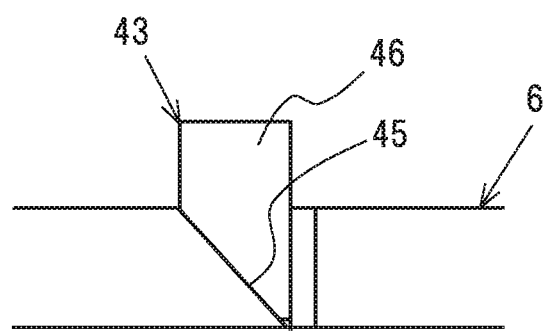
FIG. 8C illustrates a third operation state of the original position restoring means.

As illustrated in FIG. 7, the original position restoring means 43 of the injection molding die 1 according to the embodiment includes a cam surface (inclined plane) 45 formed on the gear piece 6 and a cam surface pushing projection 46 placed in the part of the fixed mold 3 facing the gear piece 6. In the original position restoring means 43 illustrated in FIG. 7, when the helical gear 2 is pushed out of the cavity 16 by the ejector sleeve 44 and the gear piece 6 rotates by a predetermined angle with respect to the movable mold main body 5 (see FIGS. 2 and 6), if mold clamping is performed when the gear piece 6 and the movable mold main body 5 are in this state, the amount of pushing of the cam surface 45 of the gear piece 6 by the cam surface pushing projection 46 of the fixed mold 3 increases as mold clamping progresses and the gear piece 6 is returned to the original position before rotating (see FIGS. 8A to 8C).

In the injection molding die 1 according to the embodiment configured as described above, in the state in which mold clamping is performed (see FIG. 1), molten synthetic resin material is injected from a plurality of pin gates 47 formed in the fixed mold 3 into the cavity 16 of the movable mold 4. After that, when the helical gear (molded article) 2 in the cavity 16 is sufficiently cooled by the coolant flowing through the piece-side coolant flow path 28 in the gear piece 6, mold opening is performed as illustrated in FIG. 2 and the helical gear 2 in the cavity 16 is pushed out by the ejector sleeve 44 (see FIG. 9). Next, mold clamping of the injection molding die 1 is performed for the next injection molding (see FIG. 1). In this cycle of the injection molding, the coolant constantly flows through the piece-side coolant flow path 28 of the gear piece 6 and the coolant cools the helical gear 2 in the cavity 16 efficiently.

As described above, in the injection molding die 1 according to the embodiment, since the coolant constantly flows through the piece-side supply flow path 31, the annular flow path 30, and the piece-side discharge flow path 32 of the gear piece 6 and the heat of the helical gear (molded article) 2 in the cavity 16 is conducted directly to the gear piece 6 by bypassing the air layer and the heat of the gear piece 6 is conducted to the coolant by bypassing the air layer, the helical gear 2 in the cavity 16 is cooled evenly and efficiently. As a result, the injection molding die 1 according to the embodiment can reduce defective molding caused by the difference in local shrinkage of the helical gear (molded article) 2. In addition, since the helical gear 2 in the cavity 16 can be cooled efficiently in the embodiment, the time required for cooling the helical gear 2 in the cavity 16 can be reduced and the cycle time required for injection molding of the helical gear 2 can be reduced as compared with the conventional example.

In the injection molding die 1 according to the embodiment, since the coolant flows through the coolant flow path 40 under negative pressure and the coolant does not leak from the connection portion (relational rotation portion between the gear piece 6 and the movable mold main body 5) between the piece-side supply flow path 31 and the movable mold main body-side supply flow path 34 and the connection portion between the piece-side discharge flow path 32 and the movable mold main body-side discharge flow path 35, a hermetic structure using O-ring or the like does not need in the connection portion between the piece-side supply flow path 31 and the movable mold main body-side supply flow path 34 and the connection portion between the piece-side discharge flow path 32 and the movable mold main body-side discharge flow path 35 and the number of components can be reduced and the mold structure can be simplified as compared with conventional examples.

The gear precision (tooth error) of the helical gear 2 manufactured by the injection molding die 1 according to the embodiment is JIS level 3, which is higher than the gear precision (JIS level 7) of a helical gear injection-molded using the gear piece 6 not having the coolant flow path 40.

Alternatively, in the injection molding die 1 according to the embodiment, the gear piece 6 may be returned to the original position using the elastic force of a spring. That is, the original position restoring means may be a spring.

In addition, in the injection molding die 1 according to the embodiment, as illustrated in FIGS. 1 and 2, the shaft mold 7, a backup plate 11, and the like are provided with a temperature adjust fluid path 49 to cool the movable mold 4 and the molded article (for example, the helical gear 2) in the cavity 16 using the coolant flowing through the temperature adjust fluid path 49. As described above, the injection molding die 1 according to the embodiment can effectively cool a molded article (for example, the helical gear 2) in the cavity 16 using the coolant flowing through the piece-side coolant flow path 28 and the coolant flowing through the temperature adjust fluid path 49, thereby enabling reduction in the cycle time of injection molding. The coolant in the temperature adjust fluid path 49 flows under pressure by a pump or the like or under negative pressure generated by the coolant circulation device 36 or the like.

(Modification 1)

Figure 10A:
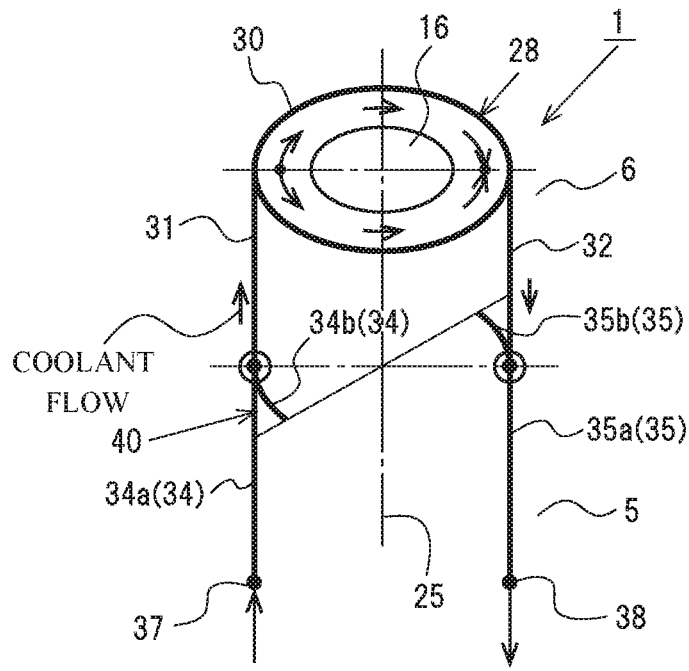
FIG. 10A illustrates the relationship between the gear piece and the movable mold during mold clamping and FIG. 10B illustrates the relationship between the gear piece and the movable mold during removal of the molded article after mold opening.
Figure 10B:
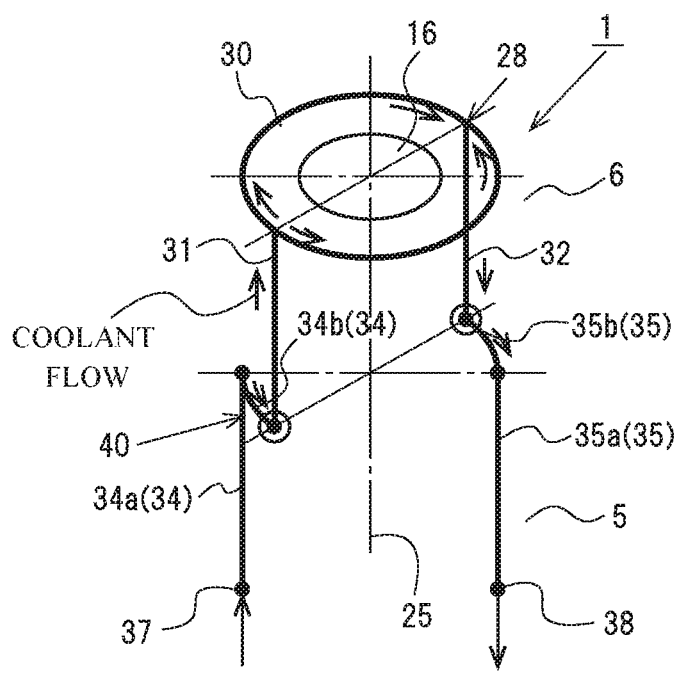

FIG. 10 illustrates modification 1 of an injection molding die 1 according to the embodiment of the invention, more specifically a modification of the coolant flow path 40. FIG. 10A illustrates the relationship between the gear piece 6 and the movable mold 4 during mold clamping and FIG. 10B illustrates the relationship between the gear piece 6 and the movable mold 4 during removal of the molded article after mold opening. FIG. 11 illustrates modification 1 of the injection molding die 1 according to the embodiment of the invention, more specifically modifications of the piece-side coolant flow path 28, the movable mold-side supply flow path 34, and the movable mold-side discharge flow path 35. FIG. 11A is a plan view of the gear piece 6, FIG. 11B is a side view of the gear piece 6, and FIG. 11C is a cross sectional view of a cross section A7-A7 of the gear piece 6 in FIG. 11A.

As illustrated in these drawings, the coolant flow path 40 of the injection molding die 1 according to modification 1 is the same as the coolant flow path 40 of the injection molding die 1 according to the first embodiment in that the coolant flow path 40 includes the movable mold main body-side supply flow path 34, the piece-side supply flow path 31, the annular flow path 30, the piece-side discharge flow path 32, and the movable mold main body-side discharge flow path 35. However, in the coolant flow path 40 of the injection molding die 1 according to modification 1, the first movable mold main body-side supply flow path portion 34a and the second movable mold main body-side supply flow path portion 34b constitute the movable mold main body-side supply flow path 34 and the first movable mold main body-side discharge flow path portion 35a and a second movable mold main body-side discharge flow path portion 35b constitute the movable mold main body-side discharge flow path 35. That is, the coolant flow path 40 of the injection molding die 1 according to modification 1 has the second movable mold main body-side supply flow path portion 34b and the second movable mold main body-side discharge flow path portion 35b as circumferential grooves in place of the second piece-side supply flow path portion 31b and the second piece-side discharge flow path portion 32b in the coolant flow path 40 of the injection molding die 1 according to the embodiment.

The second movable mold main body-side supply flow path 34b and the second movable mold main body-side discharge flow path 35b are circumferential grooves formed in the surface (surface on which the gear piece 6 slides) of the movable mold main body 5 facing the gear piece 6 so as to constantly connect the first movable mold main body-side supply flow path portion 34a to constantly connect the piece-side supply flow path 31 and constantly connect the piece-side discharge flow path 32 to the first movable mold main body-side discharge flow path portion 35a even when the gear piece 6 rotates by predetermined angle with respect to the movable mold main body 5.

The injection molding die 1 having the coolant flow path 40 according to modification 1 can obtain effects similar to those of the above embodiment.

(Modification 2)

Figure 12A:
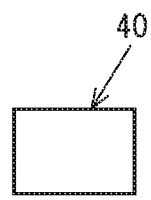
FIG. 12 illustrates modification 2 of the injection molding die according to the embodiment of the invention, more specifically a modification of the shape of the cross section of the coolant flow path.
Figure 12B:
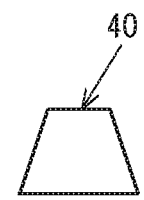

FIG. 12 illustrates the shape of the cross section of the coolant flow path 40 according to modification 2 of the embodiment. As illustrated in FIG. 12, the shape of the cross section of the coolant flow path 40 is not limited to a circle or semicircle illustrated in the above embodiment and modification 1 and may be, for example, a rectangle (see FIG. 12A) or trapezoid (see FIG. 12B).

In the injection molding die 1 provided with the coolant flow path 40 having the shape of the flow path cross section as illustrated in FIG. 12, by making the effective flow path cross section area of the coolant flow path 40 coincide with the flow path cross section area of the coolant flow path 40 according to the above embodiment and modification 1, effects similar to those of the injection molding die 1 according to the above embodiment and those of the injection molding die 1 according to modification 1 can be obtained.

(Modification 3)

FIG. 13 illustrates modification 3 of the injection molding die 1 according to the above embodiment, more specifically a part (the relationship between the gear piece 6 and the movable mold main body 5) of the injection molding die 1. FIG. 13A is a plan view of the gear piece 6, FIG. 13B is a side view of the gear piece 6, and FIG. 13C is a cross sectional view of a cross section A8-A8 of the gear piece 6 in FIG. 13A.

The gear piece 6 according to the modification is integrally formed using a metal lamination modeling technique (such as metal powder laser lamination or molten metal lamination) and the piece-side coolant flow path 28 is formed internally. Although the gear piece 6 according to the modification differs from the gear piece 6 manufactured in a metal joint technique according to the above embodiment in this point, the other of the structure is the same as in the gear piece 6 according to the above embodiment. Accordingly, the injection molding die 1 including the gear piece 6 according to the modification can obtain effects similar to those of the injection molding die 1 according to the above embodiment. In the gear piece 6 according to the modification, a desired dimensional accuracy is achieved by creating a gear piece blank using a metal lamination modeling technique and then applying various types of removal machining (such as cutting and electric discharging) to the gear piece blank.

(Modification 4)

Figure 14A:
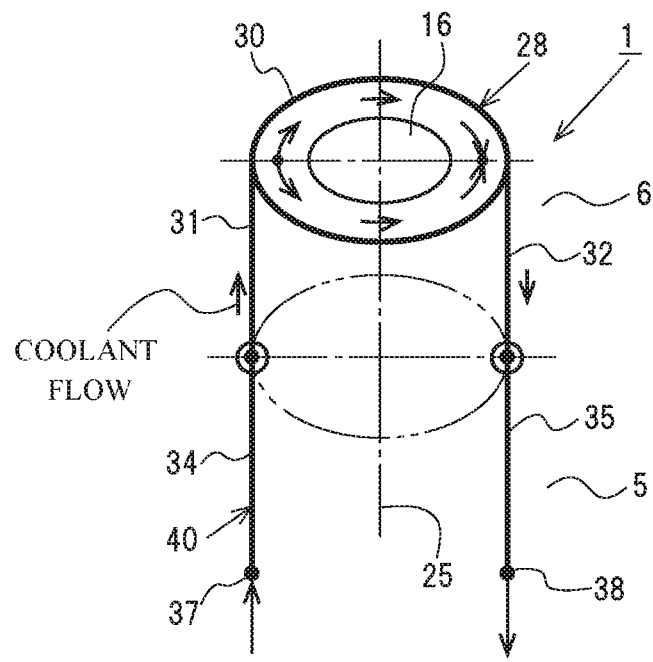
FIG. 14A illustrates the relationship between the gear piece and the movable mold during mold clamping and FIG. 14B illustrates the relationship between the gear piece and the movable mold during removal of the molded article after mold opening.
Figure 14B:
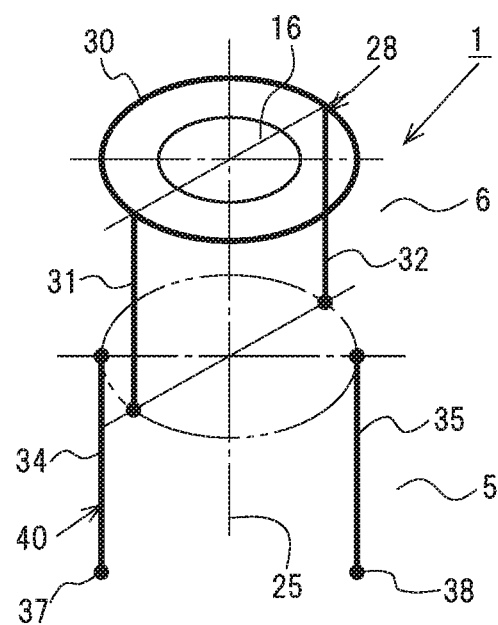

FIG. 14 illustrates modification 4 of the injection molding die 1 according to the embodiment and corresponds to FIG. 6. FIG. 14A illustrates the relationship between the gear piece 6 and the movable mold 5 during mold clamping and FIG. 14B illustrates the relationship between the gear piece 6 and the movable mold 5 during removal of the molded article after mold opening.

As illustrated in FIG. 14, the injection molding die 1 according to the modification does not have the second piece-side supply flow path portion 31b and the second piece-side discharge flow path portion 32b of the injection molding die 1 according to the above embodiment and does not have the second movable mold main body-side supply flow path portion 34b and the second movable mold main body-side discharge flow path portion 35b of the injection molding die 1 according to modification 1.

In the injection molding die 1 according to the modification, from the mold clamping to the process for removing the molded article (helical gear) after mold opening, the movable mold main body-side supply flow path 34 is connected to the piece-side supply flow path 31 and the piece-side discharge flow path 32 is connected to the movable mold main body-side discharge flow path 35, so that the coolant reliably flows through the piece-side coolant flow path 28 (see FIG. 14A).

In addition, since the gear piece (molded article piece) 6 rotates with respect to the movable mold main body 5 when the helical gear (molded article) 2 is removed from the cavity 16 after mold opening in the injection molding die 1 according to the modification, communication between the movable mold main body-side supply flow path 34 and the piece-side supply flow path 31 is interrupted and communication between the piece-side discharge flow path 32 and the movable mold-side discharge flow path 35 is interrupted (see FIGS. 2 and 14B). As a result, the coolant is trapped in the piece-side coolant flow path 28, so the coolant is not newly supplied to the piece-side coolant flow path 28 and the coolant is not flowed from the piece-side coolant flow path 28 (see FIG. 14B).

In the injection molding die 1 according to the modification, during mold clamping, the original position restoring means 43 returns the gear piece 6 to the original position before rotating, the movable mold main body-side supply flow path 34 is connected to the piece-side supply flow path 31, the piece-side discharge flow path 32 is connected to the movable mold main body-side discharge flow path 35, and the coolant is newly supplied to the piece-side coolant flow path 28 in the gear piece 6 (see FIGS. 7, 8, and 14A).

In the injection molding die 1 according to the modification, since the helical gear (molded article) in the cavity 16 is cooled efficiently by the coolant flowing through the piece-side coolant flow path 28 in the gear piece 6, effects similar to those of the injection molding die 1 according to the above embodiment can be obtained (see FIGS. 1 and 2).

(Modification 5)

Figure 15:
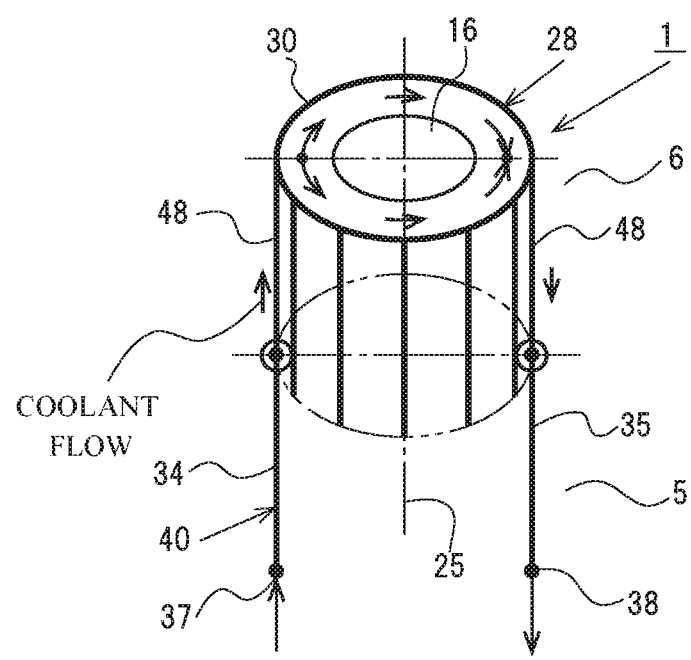
FIG. 15 illustrates modification 5 of the injection molding die according to the embodiment of the invention and corresponds to FIG. 6.

FIG. 15 illustrates modification 5 of the injection molding die 1 according to the embodiment and corresponds to FIG. 6.

In the injection molding die 1 according to the modification illustrated in FIG. 15, the original position restoring means 43 in the above embodiment is omitted and the gear piece 6 rotates by a predetermined angle with respect to the movable mold main body 5 in the same direction each time the helical gear (molded article) 2 is removed from the cavity 16. Accordingly, in the injection molding die 1 according to the modification, a plurality of flow paths 48 are formed to make connection between the annular flow path 30 and the movable mold main body-side supply flow path 34 and connection between the annular flow path 30 and the movable mold main body-side discharge flow path 35 so that the piece-side supply flow path 28 in the gear piece 6 communicates with the movable mold main body-side supply flow path 34 and the piece-side supply flow path 28 in the gear piece 6 communicates with the movable mold main body-side discharge flow path 35 even when the gear piece 6 rotates in steps of the predetermined angle. One of the plurality of flow paths 48 becomes a piece-side supply flow path connecting the annular flow path 30 to the movable mold main body-side supply flow path 34 and another of the plurality of flow paths 48 becomes a piece-side discharge flow path connecting the annular flow path 30 to the movable mold main body-side discharge flow path 35.

In the injection molding die 1 according to the modification, since the helical gear (molded article) 2 in the cavity 16 is cooled effectively by the coolant flowing through the piece-side coolant flow path 28 in the gear piece 6, effects similar to those of the injection molding die 1 according to the above embodiment can be obtained (see FIGS. 1 and 2).

(Modification 6)

Although the helical gear 2 is illustrated as the molded article piece in the injection molding dies 1 according to the above embodiment and modifications 1 to 3, the invention is not limited to the examples and applicable to the injection molding of a screw gear, a helical gear, a warm wheel, a double herringbone gear (gear configured by continuously integrating a small-diameter helical gear with a large-diameter helical gear in the axial direction), a pump bladed wheel, and the like in which the molded article piece (for example, a gear piece) rotates with respect to the movable mold main body 5. In addition, the injection molding dies 1 according to the above embodiment and modifications 1 to 3 are applicable to the injection molding of an object in which the molded article piece (6) does not need to rotate with respect to the movable mold main body 5 and effects similar to those of the above embodiment can be obtained.

(Modification 7)

Although the molded article piece (for example, the gear piece 6) rotates with respect to the movable mold main body 5 in the above embodiment and modifications 1 to 3, the invention is applicable to the case in which the molded article piece slides with respect to the movable mold main body 5.

Figures 16A, 16B:
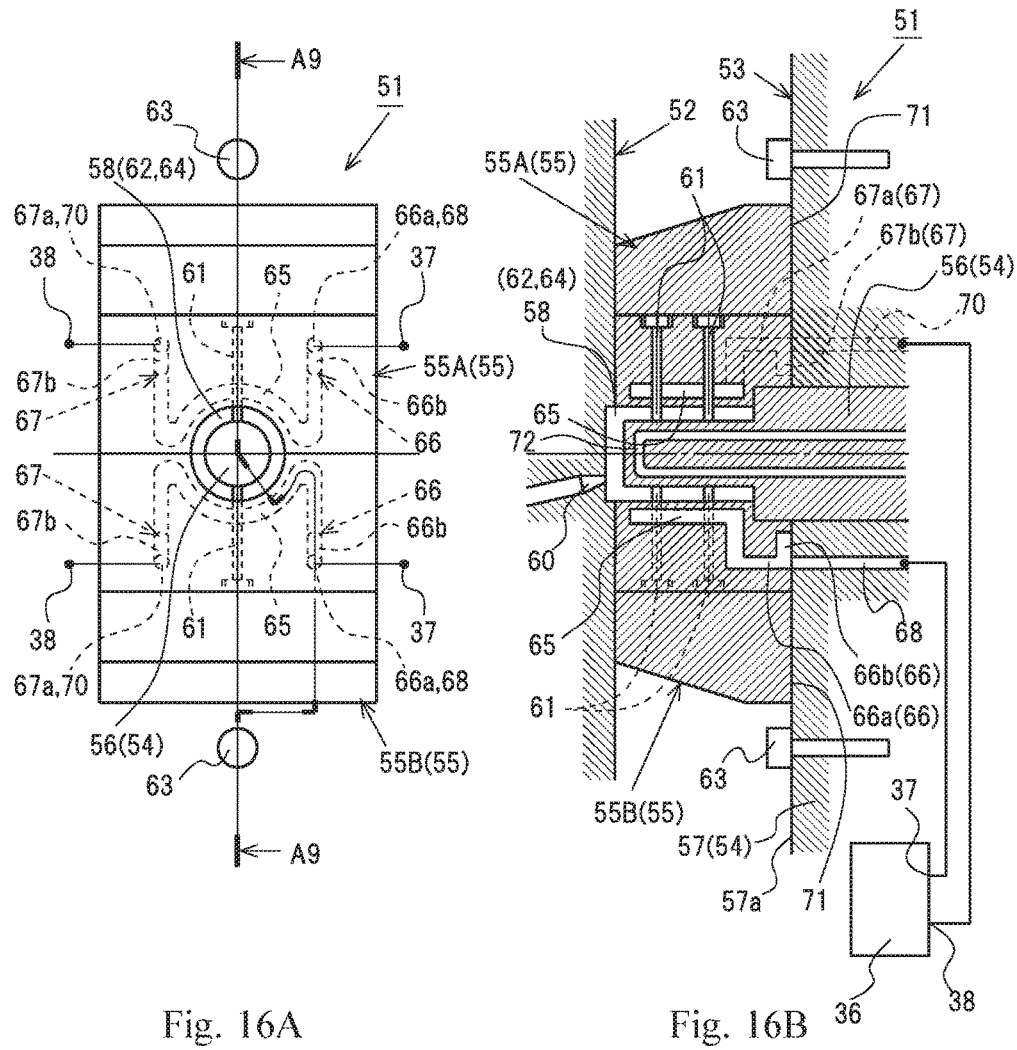
FIG. 16A is a partial plan view illustrating the movable mold in which the fixed mold is omitted and FIG. 16B is a cross sectional view (cross sectional view illustrating a cross section A9-A9 in FIG. 16A) illustrating the injection molding die.
Figures 17A, 17B:
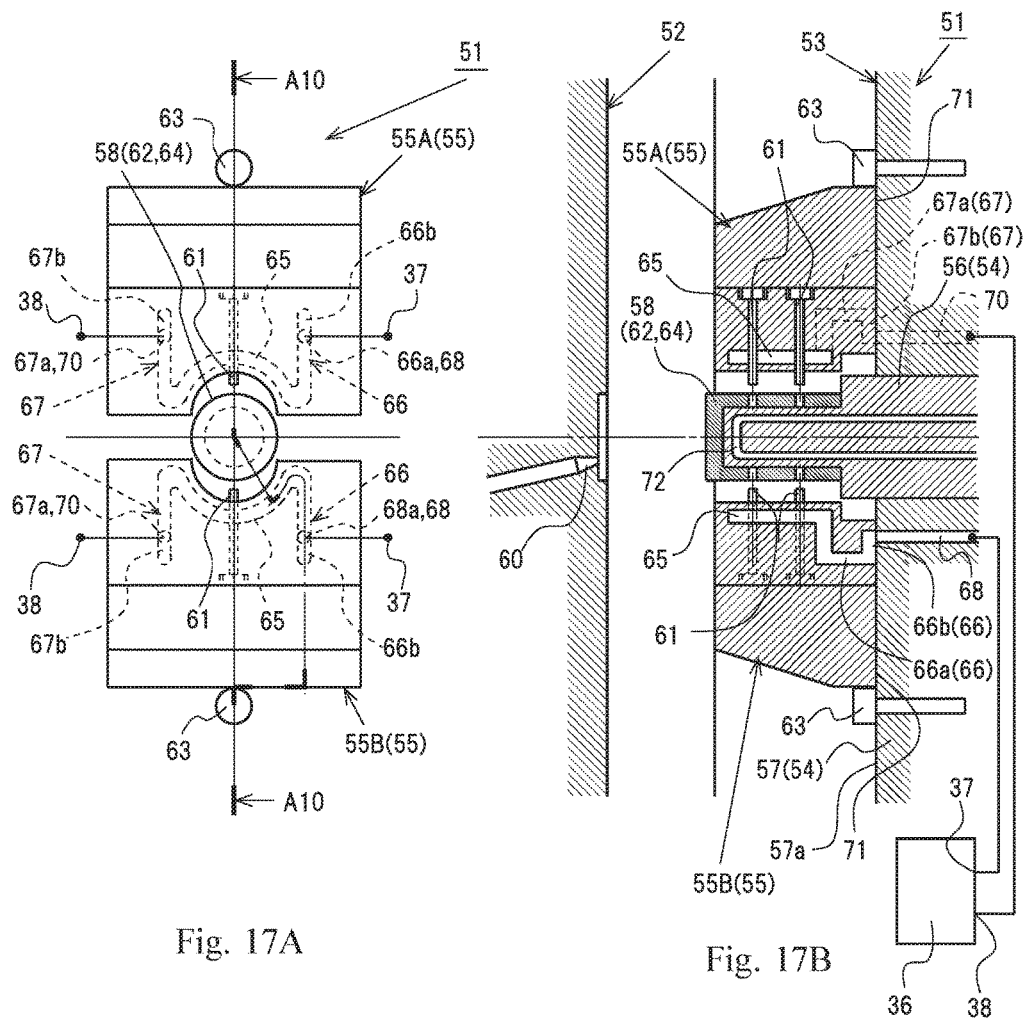
FIG. 17A is a partial plan view illustrating the movable mold in which the fixed mold is omitted and FIG. 17B is a cross sectional view (cross sectional view illustrating a cross section A10-A10 in FIG. 17A) illustrating the injection molding die.
Figure 18:
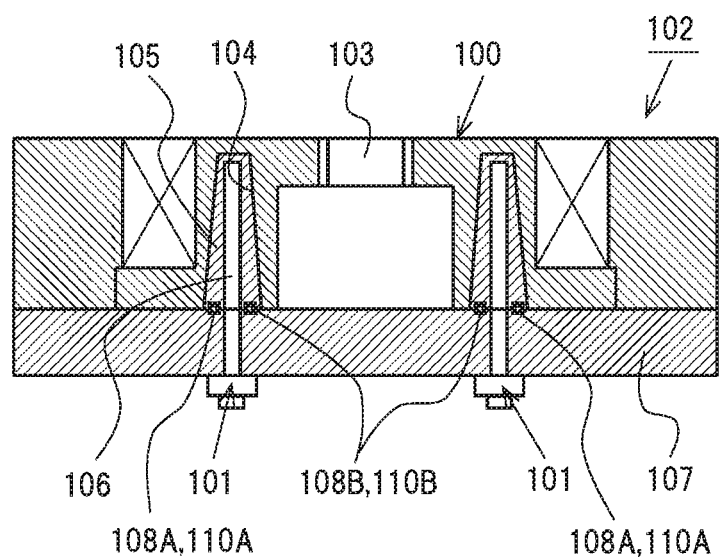
FIG. 18 is a cross sectional view illustrating a conventional injection molding die.

FIGS. 16 and 17 illustrate an injection molding die 51 according to the modification. FIG. 16 illustrates the injection molding die 51 during mold clamping, FIG. 16A is a partial plan view of a movable mold 53 in which a fixed mold 52 is not illustrated, and FIG. 16B is a cross sectional view of the injection molding die 51 (cross sectional view of a cross section A9-A9 in FIG. 16A). FIG. 17 illustrates the injection molding die 51 during mold opening, FIG. 17A is a partial plan view of the movable mold 53 in which the fixed mold 52 is not illustrated, and FIG. 17B is a cross sectional view of the injection molding die 51 (cross sectional view of a cross section A10-A10 in FIG. 17A).

As illustrated in FIG. 16, the injection molding die 51 according to the modification includes the fixed mold 52 and the movable mold 53 performing mold clamping and mold opening with respect to the fixed mold 52 (see FIG. 17). The movable mold 53 includes a movable mold main body 54 and a molded article piece 55 attached to the movable mold main body 54 so as to be relatively movable (slidable) with respect to the movable mold main body 54. The movable mold main body 54 includes a shaft mold 56 and a base block 57 to which the shaft mold 56 is assembled. The molded article piece 55 is divided into a first molded article piece 55A and a second molded article piece 55B and the first molded article piece 55A and the second molded article piece 55B form a cavity 58 between the shaft mold 56 and the fixed mold 52 during mold clamping. Molten resin is injected to the cavity 58 from a pin point gate 60 installed in the fixed mold 52. In addition, pins 61 (pins 61 for making holes in the side of a molded article 62) attached to the first molded article piece 55A and the second molded article piece 55B project in the cavity 58 (see FIG. 17).

As illustrated in FIG. 17, in the injection molding die 51 according to the modification, when the molded article 62 in the cavity 58 is removed after mold opening, the first molded article piece 55A and the second molded article piece 55B slides along the surface 57a of the base block 57 until the first molded article piece 55A and the second molded article piece 55B abut against a stopper 63 placed in the base block 57. This removes the pins 61 in the first molded article piece 55A and the pins 61 in the second molded article piece 55B from the molded article 62, so that an ejector pin (not illustrated) can push the molded article 62 out of the cavity 58. Note that the molded article 62 is a bottomed cylinder having a plurality of holes on the side thereof. Although the molded article 62 is illustrated as a bottomed cylinder in FIGS. 16 and 17 according to the modification, the molded article 62 is not limited to this example and the invention may be applied to the formation of a bottomed hollow body having a triangle cross section, a bottomed hollow body having a rectangular cross section, or a bottomed hollow body having a polygonal cross section.

In the injection molding die 51 according to the modification operating as described above, a rod-like cavity formation space 64 is formed internally in the state in which the first molded article piece 55A and the second molded article piece 55B abut against each other as illustrated in FIG. 16.

In the injection molding die 51 according to the modification, the first molded article piece 55A and the second molded article piece 55B include semi-cylindrical flow paths (cavity cooling flow paths) 65 formed along cavity formation space 64, the piece-side supply flow paths 66 introducing the coolant into the semi-cylindrical flow paths 65, and the piece-side discharge flow paths 67 introducing the coolant from the semi-cylindrical flow paths 65. The piece-side supply flow paths 66 of the first molded article piece 55A and the second molded article piece 55B are connected to movable mold main body-side supply flow paths 68 formed in the movable mold main body 54. In addition, the piece-side discharge flow paths 67 of the first molded article piece 55A and the second molded article piece 55B are connected to movable mold main body-side discharge flow paths 70 formed in the movable mold main body 54. The movable mold main body-side supply flow path 68 is connected to the coolant supply port 37 of the coolant circulation device 36. In addition, the movable mold main body-side discharge flow path 70 is connected to the coolant discharge port 38 of the coolant circulation device 36.

The piece-side supply flow paths 66 of the first molded article piece 55A and the second molded article piece 55B include the first piece-side supply flow path portions 66a connected to the semi-cylindrical flow paths 65 and the second piece-side supply flow path portions 66b connected to the movable mold main body-side supply flow paths 68. The second piece-side supply flow path portions 66b are long grooves formed along the sliding direction of the first molded article piece 55A or the second molded article piece 55B so as to constantly connect the first piece-side supply flow paths 66a and the movable mold main body-side supply flow paths 68. Here, "constantly" means one cycle from the state (mold clamping state) in which the first molded article piece 55A abuts against the second molded article piece 55B to the state in which the first molded article piece 55A abuts against the second molded article piece 55B again through the state in which the first molded article piece 55A and the second molded article piece 55B slide until they abut against the stopper 63.

In addition, the piece-side discharge flow paths 67 of the first molded article piece 55A and the second molded article piece 55B include the first piece-side discharge flow path portions 67a connected to a semi-cylindrical flow paths 65 and second piece-side discharge flow path portions 67b connected to the movable mold main body-side discharge flow paths 70. The second piece-side discharge flow path portions 67b are long grooves formed along the sliding direction of the first molded article piece 55A or the second molded article piece 55B so as to constantly connect the first piece-side discharge flow paths 67a and the movable mold main body-side discharge flow paths 70.

Although the second piece-side supply flow path portion 66b and the second piece-side discharge flow path portion 67b are formed in the parts of the first molded article piece 55A and the second molded article piece 55B close to a slide surface 71 (surface in slidable contact with the movable mold main body) in the modification, the invention is not limited to this example and long grooves functioning as the second piece-side supply flow path portion 66b and the second piece-side discharge flow path portion 67b may be formed at the end portion of the movable mold main body-side supply flow path 68 and the end portion of the movable mold main body-side discharge flow path 70.

In the modification, the first molded article piece 55A and the second molded article piece 55B are formed, as in the gear piece 6 according to the above embodiment, by creating a molded article piece blank using a metal joint technique (electric pressurizing joint or electric diffusion joint) or a metal lamination modeling technique (such as metal powder laser lamination or molten metal lamination) and then performing cutting or the like as appropriate.

In the injection molding die 51 according to the modification configured as described above, since the semi-cylindrical flow path 65 of the first molded article piece 55A and the semi-cylindrical flow path 65 of the second molded article piece 55B each have a shape obtained by halving a cylindrical flow path (virtual flow path surrounding the cavity 58), in the state in which the first molded article piece 55A abuts against the second molded article piece 55B during mold clamping, a combination of the semi-cylindrical flow path 65 of the first molded article piece 55A and the semi-cylindrical flow path 65 of the second molded article piece 55B functions as a cylindrical flow path. As a result, in the injection molding die 51 according to the modification, the cavity 58 inside the first molded article piece 55A and the second molded article piece 55B is cooled by the coolant flowing through the piece-side supply flow path 66, the semi-cylindrical flow path 65, and the piece-side discharge flow path 67 under negative pressure and effects similar to those of the injection molding die 1 according to the above embodiment can be obtained.

In addition, in the injection molding die 51 according to the modification, as illustrated in FIGS. 16 and 17, the shaft mold 56 and the like are provided with a temperature adjust fluid path 72 and the coolant flowing through the temperature adjust fluid path 72 cools the movable mold 53 and the molded article 62 in the cavity 58. As described above, the injection molding die 51 according to the modification can effectively cool the molded article 62 in the cavity 58 using the coolant flowing through the semi-cylindrical flow path (cavity cooling flow path) 65 and the coolant flowing through the temperature adjust fluid path 72, thereby enabling reduction in the cycle time of injection molding. The coolant in the temperature adjust fluid path 72 flows under pressure by a pump or the like or under negative pressure generated by the coolant circulation device 36 or the like.

In addition, in the injection molding die 51 according to the modification, as illustrated in FIGS. 16 and 17, the pins 61 attached to the first molded article piece 55A and the second molded article piece 55B penetrate through the semi-cylindrical flow path 65 and project into the cavity 58. However, since the coolant in the semi-cylindrical flow path 65 flows under negative pressure, the coolant in the semi-cylindrical flow path 65 does no leak from the gap between the pins 61 and the first molded article piece 55A and the gap between the pins 61 and the second molded article piece 55B into the cavity 58.

REFERENCE SIGNS LIST 1, 51: injection molding die
2: helical gear (molded article)
3, 52: fixed mold
4, 53: movable mold
5, 54: movable mold main body
6: gear piece (molded article piece)
14: center hole (cavity formation space)
16, 58: cavity
30: annular flow path (cavity cooling flow path)
31, 66: piece-side supply flow path
32, 67: piece-side discharge flow path
34, 68: movable mold main body-side supply flow path
35, 70: movable mold main body-side discharge flow path
36: coolant circulation device
55: molded article piece
64: cavity formation space
65: semi-cylindrical flow path

The invention claimed is:
1. An injection molding die comprising a fixed mold and a movable mold capable of performing mold clamping and mold opening with respect to the fixed mold, wherein:
the movable mold includes a movable mold main body and a molded article piece attached to the movable mold main body so as to be relatively movable, the molded article piece having a cavity formation space for forming a cavity,
the molded article piece includes a cavity cooling flow path formed along the cavity formation space, a piece-side supply flow path introducing coolant into the cavity cooling flow path, and a piece-side discharge flow path introducing the coolant from the cavity cooling flow path, the movable mold main body includes a movable mold main body-side supply flow path connected to the piece-side supply flow path and a movable mold main body-side discharge flow path connected to the piece-side discharge flow path during mold clamping and until movement of the molded article piece during removal of a molded article from the cavity after mold opening, the movable mold main body-side supply flow path, the piece-side supply flow path, the cavity cooling flow path, the piece-side discharge flow path, and the movable mold main body-side discharge flow path are connected to a coolant circulation device causing the coolant to flow under negative pressure, and the cavity of the molded article piece is cooled by the coolant in the piece-side supply flow path, the cavity cooling flow path, and the piece-side discharge flow path by bypassing an air layer.

2. The injection molding die according to claim 1, wherein the cavity cooling flow path is an annular flow path surrounding the cavity formation space.

3. The injection molding die according to claim 2, wherein the molded article piece is attached to the movable mold main body so as to be relatively movable and rotates with respect to the movable mold main body during the removal of the molded article from the cavity.

4. The injection molding die according to claim 3, wherein the piece-side supply flow path and the piece-side discharge flow path are constantly connected to the movable mold main body-side supply flow path and the movable mold main body-side discharge flow path, respectively, when the molded article piece does not move with respect to the movable mold main body or even when the molded article piece relatively rotates with respect to the movable mold main body.

5. The injection molding die according to claim 3, wherein a plurality of movable mold main body-side supply flow paths and a plurality of movable mold main body-side discharge flow paths are provided so that, each time the molded article piece rotates by a predetermined angle with respect to the movable mold main body, the movable mold main body-side supply flow path is connected to the piece-side supply flow path and the movable mold main body-side discharge flow path is connected to the piece-side discharge flow path, the movable mold main body-side supply flow path being one of the plurality of movable mold main body-side supply flow paths and the movable mold main body-side discharge flow path being one of the plurality of movable mold main body-side discharge flow paths.

6. The injection molding die according to claim 3, wherein, after the molded article piece rotates with respect to the movable mold main body from an original position, the molded article piece is returned to the original position with respect to the movable mold main body by the original position restoring means during mold clamping of the movable mold and the fixed mold.

7. The injection molding die according to claim 6, wherein the original position restoring means includes a cam surface formed on the molded article piece and a cam surface pressing projection disposed in a part of the fixed mold facing the molded article piece, the cam surface pressing projection returns the molded article piece to the original position with respect to the movable mold main body by pressing the cam surface during the mold clamping of the movable mold main body and the fixed mold after the molded article piece rotates with respect to the movable mold main body.

8. The injection molding die according to claim 4, wherein, after the molded article piece rotates with respect to the movable mold main body from an original position, the molded article piece is returned to the original position with respect to the movable mold main body by the original position restoring means during mold clamping of the movable mold and the fixed mold.

* * * * *